(12) United States Patent
Downing et al.

(10) Patent No.: US 7,075,959 B1
(45) Date of Patent: Jul. 11, 2006

(54) COOLING DEVICE FOR DIODE PUMPED LASER

(75) Inventors: Robert Scott Downing, Rockford, IL (US); Eric Michael Lindsay-Jones, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 294 days.

(21) Appl. No.: 10/713,470

(22) Filed: Nov. 14, 2003

(51) Int. Cl.
*H01S 3/04* (2006.01)

(52) U.S. Cl. .......................................... 372/35; 372/34

(58) Field of Classification Search ................. 372/35, 372/34; 165/80.4, 104.33, 167; 429/35
See application file for complete search history.

(56) References Cited

U.S. PATENT DOCUMENTS

| | | | |
|---|---|---|---|
| 4,494,171 A | | 1/1985 | Bland |
| 4,729,060 A | | 3/1988 | Yamamoto |
| 4,910,642 A | | 3/1990 | Downing |
| 4,962,444 A | | 10/1990 | Niggemann |
| 5,029,335 A | | 7/1991 | Fisher |
| 5,088,005 A | | 2/1992 | Ciaccio |
| 5,105,430 A | * | 4/1992 | Mundinger et al. ........... 372/35 |
| 5,471,491 A | | 11/1995 | Phillips |
| 5,727,618 A | * | 3/1998 | Mundinger et al. ........ 165/80.4 |
| 6,152,215 A | * | 11/2000 | Niggemann ................. 165/166 |
| 6,173,760 B1 | | 1/2001 | Gardell |
| 6,414,847 B1 | | 7/2002 | Hutchison |
| 6,643,302 B1 | * | 11/2003 | Nishikawa et al. ........... 372/35 |
| 6,690,696 B1 | * | 2/2004 | Byren et al. .................. 372/35 |
| 6,865,200 B1 | * | 3/2005 | Takigawa et al. ............. 372/35 |

OTHER PUBLICATIONS

Society of Automotive Engineers, Inc.; SAE Technical Paper Series, Jul. 1983: "A Compact High Intensity Cooler (CHIC)".
Society of Automotive Engineers, Inc.; SAE Technical Paper Series, Oct. 1990: "The Development of Advanced Cooling Methods for High-Power Electronics".
Society of Automotive Engineers, Inc.; SAE Technical Paper Series, Apr. 1994: "A High Flux Heat Exchanger for Military Avionics, Part I: Design and Fabrication".
Society of Automotive Engineers, Inc.; SAE Technical Paper Series, Apr. 1994: "A High Flux Heat Exchanger for Military Avionics, Part II: Test Results".

* cited by examiner

*Primary Examiner*—Minsun Harvey
*Assistant Examiner*—Tuan N. Nguyen
(74) *Attorney, Agent, or Firm*—Carlson, Gaskey & Olds

(57) ABSTRACT

A cooling device for a diode pumped laser slab includes a plurality of stacked sapphire layers that partially absorb stray fluorescent light that is emitted from the laser slab. The layers include a plurality of fluid orifices and fluid channels that define a fluid pathway for a coolant medium. The coolant medium and sapphire layers cooperate to maintain the temperature of the laser slab below a predetermined temperature level.

18 Claims, 3 Drawing Sheets

COOLING DEVICE FOR DIODE PUMPED LASER

BACKGROUND OF THE INVENTION

This invention relates generally to the cooling of electronic and optical devices. More specifically, the invention relates to an impingement cooling device for a diode pumped laser slab that uses a fluorescent energy absorbing material to cool the laser slab.

Generally, a diode pumped laser is a solid state laser constructed from a semi-conductor material. A voltage is applied across the semi-conductor and causes the emission of light radiation.

Traditionally, diode pumped laser slabs have included bonded layers of dissimilar materials, such as yttrium-aluminum-garnet (YAG) bonded with sapphire. For the laser to function correctly, the bonded interface must maintain a low stress level.

Diode lasers typically operate intermittently such as cycling between two seconds on and two seconds off. This cycling operation produces heat and stray fluorescent light. The stray fluorescent light reflects back to the slab and dissipates as heat. Poor dissipation of the heat creates thermal stresses at the bonded interface and can cause the laser to malfunction. To avoid this potential problem, the temperature of the bonded interface must be maintained at an isothermality of 5° C. or lower.

One method for managing and dissipating the heat utilizes a heat exchanging device, such as an impingement cooling device. An impingement cooling device includes a series of stacked layers with each layer being positioned approximately parallel to the laser slab. The layers contain fluid channels (spacers) and fluid orifices such that when the layers are stacked, the channels and orifices form pathways through the stack leading to and from the laser slab. A coolant circulates through pathways formed by sets of orifice and spacer layers to impinge onto the laser slab and then exits through relatively straight fluid channels.

Conventional impingement cooling devices, such as those produced of copper layers, do not adequately manage stray fluorescent light. Conventional devices reflect the stray fluorescent light back into the laser slab. Thus, the laser slab generates additional heat from the absorption of the stray fluorescent light, thereby concentrating the total heat generated by the laser slab at the cooler-slab interface. This increased heat concentration makes it more difficult to maintain a proper temperature in the laser slab.

Additionally, conventional impingement cooling devices do not have adequate heat dissipation characteristics. In such conventional devices, the copper layer closest to the laser slab absorbs heat from the laser slab. Thus, the copper layer closest to the laser slab has a relatively high heat absorption density compared to copper layers that are positioned farther from the laser slab. This uneven heat absorption density further adds to the difficulty of maintaining a proper temperature in the laser slab.

Thus, there is a need for a cooling device that provides improved management of stray fluorescent light and improved heat dissipation characteristics.

SUMMARY OF THE INVENTION

In general terms, this invention is a cooling device that includes layers of fluorescent energy absorbing material that cooperate with a coolant to advantageously manage stray fluorescent light and dissipate heat emitted from a laser pumped diode.

In one example, sapphire layers stacked on a diode pumped laser slab form an impingement cooling device that absorbs stray fluorescent light and dissipates heat at various distances from the laser slab. The sapphire layers may be specially adapted by texturing, coating, or doping the layers. The sapphire layers diffuse and absorb at least a portion of the stray fluorescent light.

In another example, the stacked sapphire layers additionally include storage channels for a thermal energy storage material. The storage channels are offset within the layers so that each storage channel has an unobstructed view from the laser slab. The thermal energy storage material that is deposited into each storage channel comprises a room temperature vulcanizing material filled with at least one of beryllium oxide or aluminum oxide.

In another example, the stacked layer material comprises sapphire or copper and the stacked layers include at least one groove formed in the side of the layer that is directly adjacent to the laser slab. The groove has walls that define a half-hexagon cross sectional shape with peaks and valleys in the stacked layers. The walls of the groove provide for heat dissipation at various distances from the laser slab as well as greater surface area to transfer heat to.

The various features and advantages of this invention will become apparent to those skilled in the art from the following detailed description of the currently preferred embodiment. The drawings that accompany the detailed description can be briefly described as follows.

DETAILED DESCRIPTION OF THE PREFFERRED EMBODIMENT

Figure 1:
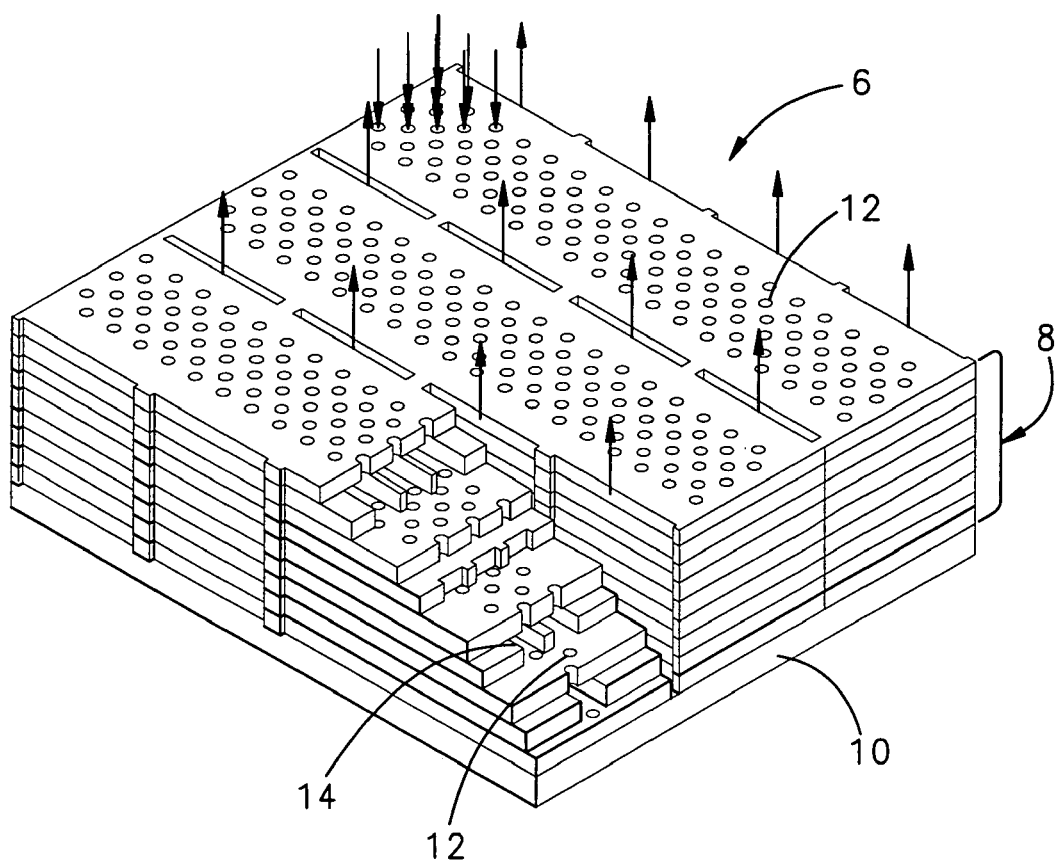
FIG. 1 is a general view of an impingement cooling structure.

FIG. 1 refers generally to a layered impingement cooling structure 6. The layered impingement cooling structure 6 comprises a plurality of stacked layers 8 on top of a laser slab 10. The stacked layers 8 include various fluid orifices 12 and fluid channels 14 that define a coolant flow pathway though the layered impingement cooling structure 6 to and from the laser slab 10. A coolant medium flows through the stacked layers 8 and impinges onto the laser slab 10 to cool the slab.

Figure 2:
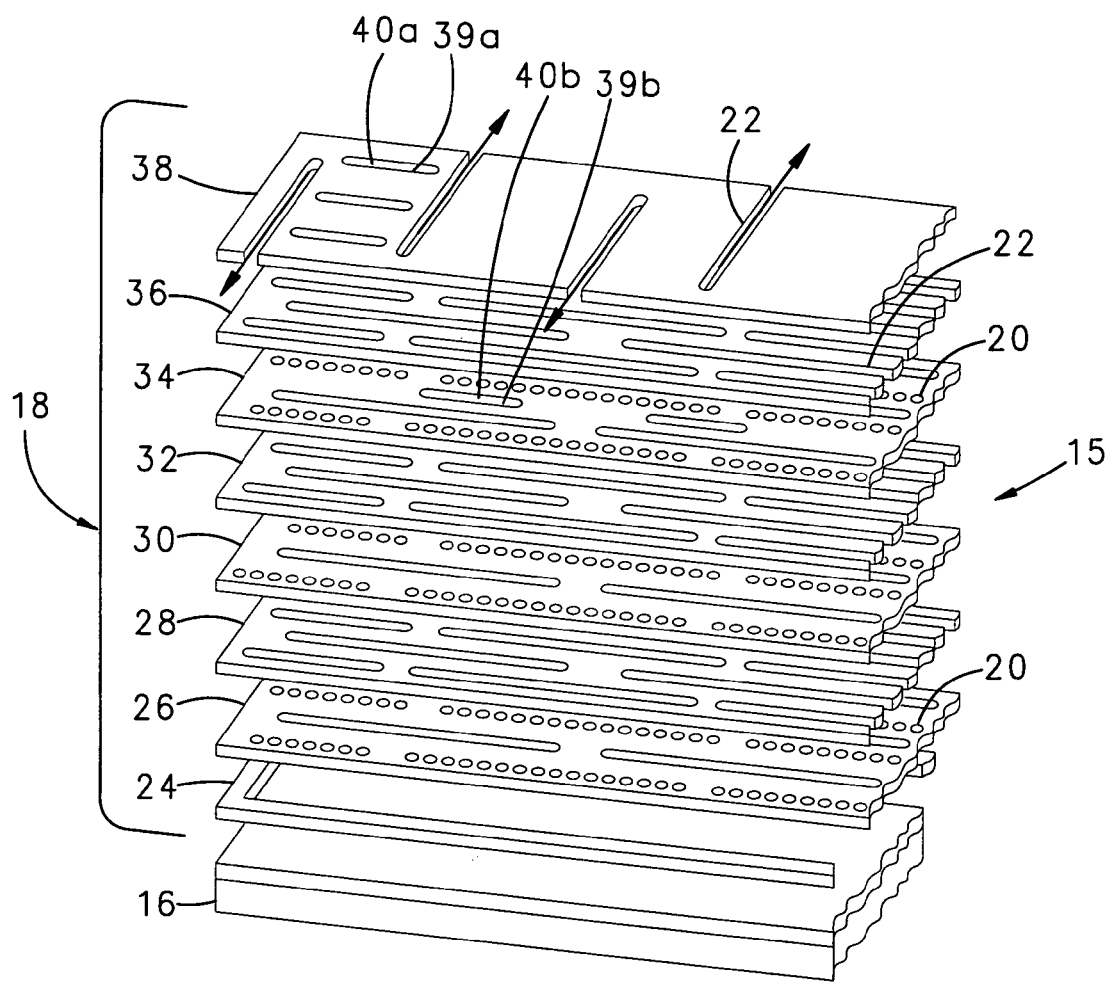
FIG. 2 is an exploded view of an impingement cooling device according to the invention.

In one example shown in FIG. 2, the layered impingement cooling structure 6 comprises a sapphire layered cooling structure 15. The sapphire layered cooling structure 15 includes stacked sapphire layers 18 on top of a YAG-sapphire laser slab 16. The stacked sapphire layers 18 include a plurality of fluid orifices 20 and fluid channels 22 that define a coolant medium flow pathway through the cooling structure.

During operation, the slab produces stray fluorescent light, which in turn generates heat. The stacked sapphire layers 18 are particularly advantageous for managing the stray fluorescent light and heat produced by the YAG-sapphire laser slab 16. Pure sapphire is nearly transparent to fluorescent light. However, sapphire layers that are specially adapted will diffuse and absorb a portion of the fluorescent light and convert it to heat. The heat then dissipates through the coolant medium. One skilled in the art would recognize additional suitable fluorescent light absorbing materials that could be used in addition to or instead of the sapphire material, including but not limited to AION™, alumina, and spinel.

One example of specially adapted sapphire is impure sapphire. Impurities are doped into the sapphire or occur naturally in the sapphire and make the sapphire less transparent to fluorescent light. This allows the sapphire layers to diffuse and absorb a portion of the fluorescent light and convert it to heat.

Another example of specially adapted sapphire is a sapphire layer that has at least one textured surface. The textured surface is preferably formed by chemically etching the sapphire layer surface, however one skilled in the art would recognize that other suitable texturing methods could also be used. The textured surface allows the sapphire layer to diffuse and absorb a portion of the fluorescent light and convert it to heat.

Another example of specially adapted sapphire is a sapphire layer that has a coating. The coating is deposited on the sapphire layer by chemical vapor deposition; however, one skilled in the art would recognize that other suitable coating deposition methods could also be used, including but not limited to flame spray, sputtering, dipping, and electroplating. The coating is deposited with a thickness on the order of a few microns. The coating allows the sapphire layer to diffuse and absorb a portion of the fluorescent light. The fluorescent light is converted to heat at the surface of the layer where the heat can be readily cooled.

The stacked sapphire layers 18 also dissipate fluorescent light heat at various layer distances from the YAG-sapphire laser slab 16 by partially absorbing the stray fluorescent light. Thus, the second and subsequent layer distances from the slab see exposure to stray fluorescent light that is not absorbed by the first layer and likewise partially absorb fluorescent light and convert it to heat. This allows the fluorescent light to be dissipated as heat over a range of layer distances from the slab in the impingement cooling structure 15.

The coolant medium cooperates with the stacked sapphire layers 18 to maintain the YAG-sapphire laser slab 16 below a predetermined temperature limit. This is accomplished in two ways. First, the YAG-sapphire laser slab 16 transfers heat directly to the coolant medium as the coolant medium flows onto the slab 16 from the pathway created by the fluid orifices 20 and fluid channels 22. When the coolant medium exits the slab 16, it removes heat from the slab 16. Second, the stacked sapphire layers 18 transfer heat that is generated from the absorption of stray fluorescent light to the coolant medium as the coolant medium flows through the fluid orifices 20 and fluid channels 22 of the various layers.

In the example in FIG. 2, the stacked sapphire layers 18 are preferably not bonded together. Once assembled, the adjacent surfaces of the layers 18 are flush with one another and exhibit minimal or no leaking of coolant medium. As a result, bonding of the layers only adds unnecessary processing steps and cost. Alternatively, the stacked sapphire layers 18 may be bonded via diffusion bonding or other suitable bonding method known by one skilled in the art.

The layers 18 are comprised of a target frame 24, a first orifice plate 26, a first spacer plate 28, a flipped orifice plate 30, a second spacer plate 32, a second orifice plate 34, a slot plate 36, and a cover plate 38. One skilled in the art would recognize additional suitable layer arrangements and architectures that would likewise benefit from the invention.

The fluid orifices 20 of the second orifice plate 34 are consecutively aligned and impinge approximately mid-way between the fluid orifices 20 of the flipped orifice plate 30 which are also consecutively aligned. The fluid orifices 20 of the flipped orifice plate 30 are consecutively aligned and impinge approximately mid-way between the fluid orifices 20 of the first orifice plate 26 which are also consecutively aligned. The fluid orifices 20 of the first orifice plate 26 impinge directly onto the YAG-sapphire laser slab 16. The three orifice plates cooperate with the first spacer plate 28, second spacer plate 32, and slot plate 36 to create a tortuous path for the coolant medium flow.

The target frame 24 is comprised only of a narrow band that extends around the outer perimeter of the YAG-sapphire laser slab 16 and is positioned between the YAG-sapphire laser slab 16 and the first orifice plate 26. This forms a cavity for coolant medium to flow between the YAG-sapphire laser slab 16 and the first orifice plate 26.

The cover plate 38 includes at least one storage channel 39a with thermal energy storage material 40. One skilled in the art would recognize alternative layers of the stacked sapphire layers 18 that would likewise benefit from the use of storage channels with thermal energy storage material. The storage channels 39a are cut into the stacked sapphire layers 18 by electro discharge machining, water-jet, laser, or other suitable machining processes. The storage channel 39a extends entirely through the thickness of the cover plate 38 and is oriented with its length approximately parallel to the length of the YAG-sapphire laser slab 16. One skilled in the art would recognize additional beneficial orientations.

The second orifice plate 34 also includes a storage channel 39b with thermal energy storage material 40b. One skilled in the art would recognize additional or alternate suitable locations within the sapphire layers 18 that would likewise benefit from use of thermal energy storage material. The storage channel 39b with thermal energy storage material 40b of the second orifice plate 34 is offset from the storage channel 39a with thermal energy storage material 40a of the cover plate 38, relative to the YAG-sapphire laser slab 16. The stray fluorescent light travels in an essentially normal direction from the plane of the YAG-sapphire laser slab 16. Therefore, an offset provides an uninterrupted line-of-sight from the YAG-sapphire laser slab 16 to the thermal energy storage material 40a and thermal energy storage material 40b.

The thermal energy storage material 40*a* and 40*b* preferably has relatively high thermal diffusivity and high specific heat. For example, the favored materials include room temperature vulcanizing elastomer filled with one of beryllium oxide or aluminum oxide. It should be understood that other suitable thermal energy storage materials and fillers known in the art could also be used.

Another example of a thermal energy storage material is a phase change material such as water. Water freezes near the operational temperature of the YAG-sapphire laser slab 16. When the laser is inactive the water is frozen ice. When the laser is active the frozen ice absorbs heat and melts. Once melted, the coolant medium re-freezes the water when the laser is inactive. It should be understood that other suitable phase change materials known in the art could also be used to aid in cooling.

The storage channel 39*a* with thermal energy storage material 40*a* in the cover plate 38 aids in dissipating heat. When the YAG-sapphire laser slab 16 is active, the thermal energy storage material 40*a* absorbs heat. When the YAG-sapphire laser slab 16 is inactive, such as between cycles, the thermal energy storage material 40*a* releases heat to the coolant medium. The storage channel 39*b* with thermal energy storage material 40*b* in the second orifice plate 34 operates in a similar manner.

Figure 3:
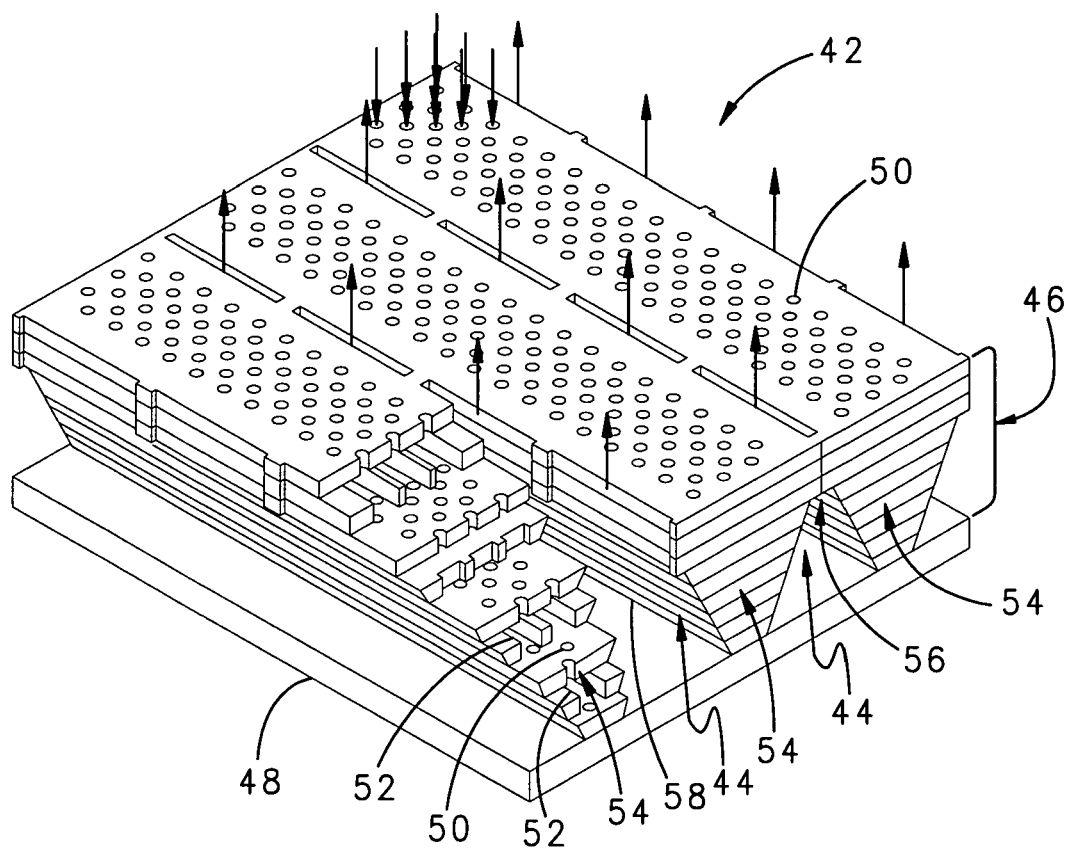
FIG. 3 is a perspective cross sectional view of another impingement cooling device according to the invention.

In another example shown in FIG. 3, the layered impingement cooling device 6 comprises an impingement cooling device 42 with grooves 44. The grooves 44 have a three sided "half-hexagon" cross-sectional shape. One skilled in the art would recognize additional groove cross sectional geometries that would likewise suit such impingement cooling devices.

The impingement cooling device 42 comprises layers 46 that are stacked on top of a YAG-sapphire laser slab 48 that emits stray fluorescent light during typical operation. The layers 46 include fluid orifices 50 and fluid channels 52 that cooperate to form a fluid pathway for the coolant medium.

The grooves 44 are formed into the layers 46 by electro discharge machining, water-jet, laser, or other suitable machining processes. The grooves 44 are cut into the side of the layers 46 that are directly adjacent to the YAG-sapphire laser slab 48 and provide angled surfaces relative to the planes of the layers 46.

In this example, the grooves 44 penetrate though several of the layers 46. The grooves 44 have peak portions 54 and valley portions 56 that are formed during the machining process.

The impingement cooling device 42 optionally may include a plurality of grooves 44 that run parallel to each other, perpendicular to each other, or some other arrangement recognized as beneficial by one skilled in the art.

During operation of the impingement cooling device 42, the coolant medium flows through the fluid orifices 50 and fluid channels 52 and impinges on the YAG-sapphire laser slab 48 from the peak portions 54. The coolant medium exits through the valley portions 56.

The groove walls 58 are angled relative to the planes of the layers 46 and provide surface area at various layer distances from the YAG-sapphire laser slab for absorption of heat and stray fluorescent light. This helps to dissipate heat in at least two ways. First, the angled edge 60 is capable of absorbing heat and stray fluorescent light from the YAG-sapphire laser slab 48. Absorption and dissipation of heat and stray fluorescent light at a distance of at least several layers from the slab reduces the absorption density that would otherwise be concentrated within the first layer distance from the slab if there were no grooves. Second, the groove walls 58 provide greater surface area to transfer heat to, compared to similar impingement cooling devices without grooves.

The layers 46 are preferably formed from a sapphire material. The layers 46 of sapphire material may be bonded together via a suitable bonding method prior to cutting the grooves 44. The sapphire is specially adapted and exhibits the same stray fluorescent light characteristics and advantages as mentioned above (FIG. 2).

Alternatively, the layers 46 may be formed from copper and bonded via diffusion bonding, brazing, or other suitable bonding method, but copper layers will of course not exhibit all of the favorable stray light characteristics of sapphire and specially adapted sapphire.

The invention has been described in an illustrative manner, and it is to be understood that the terminology used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

We claim:

1. A cooling device comprising:
   a heat producing source that emits fluorescent energy;
   at least one layer of fluorescent energy absorbing material positioned adjacent to said heat producing source and comprising a plurality of stacked layers of fluorescent energy absorbing material with each layer including a plurality of fluid orifices and fluid channels that cooperate with each other to define a fluid flow pathway for said coolant medium through said stacked layers to form an impingement cooling device, wherein said at least one layer of fluorescent energy absorbing material includes at least one storage channel having a thermal energy storage material disposed therein; and
   a coolant medium in fluid contact with said at least one layer of fluorescent energy absorbing material wherein said at least one layer of fluorescent energy absorbing material and said coolant medium cooperate to maintain a temperature level of said heat producing source below a predetermined level.

2. The cooling device as recited in claim 1, wherein said at least one layer of fluorescent energy absorbing material comprises sapphire.

3. The cooling device as recited in claim 1, wherein said at least one layer of fluorescent energy absorbing material includes at least one textured surface for diffusing fluorescent light.

4. The cooling device as recited in claim 1, wherein said at least one layer of fluorescent energy absorbing material comprises a coating for diffusing fluorescent light.

5. The cooling device as recited in claim 1, wherein said heat producing source comprises a diode pumped laser slab.

6. The cooling device recited in claim 1, wherein said thermal energy storage material comprises at least one of a phase change material and a room temperature vulcanizing elastomer, said room temperature vulcanizing elastomer including a filler, and wherein said filler includes at least one of beryllium oxide and aluminum oxide.

7. The cooling device recited in claim 1, wherein said at least one storage channel comprises at least a first and second storage channels with each of said first and second storage channels having a thermal energy storage material disposed therein, wherein said first and second storage channels are non-colinear.

8. The cooling device recited in claim 7, wherein said first and second storage channels are formed in different layers of said plurality of stacked layers and are offset from each other relative to said heat producing source.

9. The cooling device recited in claim 7, wherein said first and second storage channels are formed in the same layer of said plurality of stacked layers.

10. A method for cooling a heat producing source comprising the steps of:
   (a) positioning at least one layer of fluorescent energy absorbing material adjacent to a heat producing source, forming an impingement cooling device by positioning a plurality of stacked layers of fluorescent energy absorbing material adjacent to the heat producing source, and forming a plurality of fluid orifices and fluid channels in each layer that cooperate to define a fluid pathway for a coolant medium;
   (b) absorbing emitted fluorescent energy from the heat producing source with the at least one layer of fluorescent energy absorbing material;
   (c) cooling the fluorescent energy absorbing material with the coolant medium; and
   (d) forming at least one storage channel in the at least one layer of fluorescent energy absorbing material and depositing a thermal energy storage material within the storage channel.

11. The method for cooling a heat producing source as recited in claim 10, wherein the fluorescent energy absorbing material comprises sapphire.

12. The method for cooling a heat producing source as recited in claim 10, including the steps of forming at least one textured surface on the at least one layer of fluorescent energy absorbing material, and diffusing fluorescent light with the at least one textured surface.

13. The method for cooling a heat producing source as recited in claim 10, including the steps of depositing a coating on the at least one layer of fluorescent energy absorbing material, and diffusing fluorescent light with the coating.

14. The method for cooling a heat producing source as recited in claim 10, wherein the heat producing source comprises a diode pumped laser slab.

15. The method for cooling a heat producing source as recited in claim 10, wherein the thermal energy storage material comprises a room temperature vulcanizing elastomer including a filler that includes at least one of beryllium oxide and aluminum oxide.

16. The method for cooling a heat producing source as recited in claim 10, including the steps of forming non-colinear first and second storage channels in the plurality of stacked layers and depositing a thermal energy storage material within the first and second storage channels.

17. The cooling device recited in claim 16, including the step of forming the first and second storage channels in the same layer.

18. The cooling device recited in claim 16, including the steps of forming the first and second storage channels in different layers and offsetting the first and second storage channels relative to the heat producing source.

* * * * *